United States Patent Office 3,434,798
Patented Mar. 25, 1969

3,434,798
PROCESS FOR RECOVERING ZINC FROM FERRITES
Francisco Javier Sitges Menendez and Vicente Arregui Fernandez, Castrillon, Oviedo, Spain, assignors to Compagnie Royale Asturienne des Mines, Brussels, Belgium, a Spanish company
No Drawing. Filed Sept. 20, 1965, Ser. No. 488,786
Claims priority, application Spain, Oct. 2, 1964, 304,601
Int. Cl. C01g 9/06
U.S. Cl. 23—125         4 Claims

ABSTRACT OF THE DISCLOSURE

Zinc values are obtained from zinc plant residue by dissolving the zinc ferrites contained therein with sulfuric acid having an initial concentration of at least about 300 g./l. and a concentration after dissolution of about 180 to 200 g./l. The resulting solution is diluted and neutralized so as to precipitate basic iron sulphate and recover a zinc sulphate solution. The zinc sulphate solution is electrolyzed in order to obtain the desired zinc values.

BACKGROUND OF THE INVENTION

The invention relates to a process for recovering zinc values from zinc plant residue. More particularly, this invention is directed to a process for resolving zinc ferrite into zinc sulphate and iron sulphate which may be separated so as to permit recovery of zinc values from the zinc sulphate.

It is known that zinc values may be obtained from zinc sulphide concentrates by roasting the concentrates to produce a calcine comprising zinc oxide, dissolving the oxide in aqueous sulfuric acid to provide a zinc sulphate solution which is subsequently electrolyzed to yield the desired zinc value. The oxygen which is freed during the electrolysis regenerates sulfuric acid which may be recycled to dissolve additional zinc oxide. This return acid, is commonly called "spent electrolyte" or "return acid."

During the roasting of zinc sulphide concentrates, a portion of the zinc, as well as other heavier metal constituents such as copper, cadmium and lead, combine with a portion of the iron content thereof to form "ferrite" compounds which, generally speaking, are believed to correspond to the formula $MeO \cdot Fe_2O_3$, in which Me may be any of the above-named metals.

Zinc ferrites, $ZnO \cdot F_2O_3$, are insoluble in the aqueous solution of sulfuric acid used in the leaching of zinc oxide under conditions normally existing in the leaching operations of electrolytic zinc recovery processes. The higher the iron content in the zinc ore concentrate, the greater the amount of zinc converted into the insoluble form during roasting. Consequently, a residue is obtained from the leaching stage which has a zinc content of about 18–20%, the larger portion of which is in the form of zinc ferrite, and the remainder comprising unroasted zinc sulphide. Various methods have been suggested for recovering the zinc from these residues. For instance, roasting the residue with concentrated sulfuric acid to break down ferrites and convert the zinc into easily soluble zinc sulphate, or leaching with "return acid," in autoclaves at 200–250° C. coupled with altering the oxidation-reduction conditions by the use of additives. Or leaching with "return acid" at moderate temperatures, the breaking down of the ferrites being facilitated by the use of scrap iron turnings, and subsequent complex process of decanting, filtering, and washing.

None of these methods has proved commercially practicable, owing to the complexity of the operations involved and the cost of the equipment required, which may, indeed, be prohibitive on an industrial scale.

SUMMARY OF THE INVENTION

Accordingly, it is an object of the present invention to provide a process for resolving zinc from zinc ferrite.

This and other advantages of the present invention are realized in a process conducted at atmospheric pressure and at a temperature within the range 90–95° C. which comprises:

(1) Treating said residue with a sulfuric acid solution having an initial concentration of not less than 300 g./l. $H_2SO_4$ thereby dissolving said residue to obtain a resulting solution containing zinc sulphate and iron sulphate, said resulting solution having a sulfuric acid concentration of 180–200 g./l., (2) Separating undissolved residue containing said heavier metals from said solution, (3) Adding a diluent to said solution so as to obtain a more dilute solution based on the content of said iron sulphate, (4) Neutralizing said solution to an acidity of about 3–5 g./l. $H_2SO_4$ so as to form a granular basic iron sulphate precipitate and a zinc sulphate solution, and (5) Separating said basic iron sulphate precipitate from said zinc sulphate solution.

DETAILED DESCRIPTION OF THE INVENTION

The process of the present invention may be considered to occur in two stages. In the first stage, zinc plant residue, substantially comprising zinc ferrite, is treated with an aqueous sulfuric solution having an initial concentration of at least about 300 g./l. The sulfuric acid solution will normally have been previously heated to a temperature within the range 90–95° C. The acid solution may be "return acid" from an electrolytic zinc recovery process along with "new" concentrated sulfuric acid.

The initial sulfuric acid concentration is chosen, bearing in mind the amount necessary for reaction with the metals to produce sulphates, so as to ensure an excess acid concentration of about 180–200 g./l. $H_2SO_4$. By carrying out the leaching under these conditions the ferrites are resolved in a relatively short time, usually 2 to 3 hours.

The residue from this first stage in the process is easily drawn off by decanting and may contain valuable metals, such as lead and silver, which have not been dissolved during the leaching operation.

In the second stage the solution resulting from the first stage, which contains the zinc and iron dissolved from the ferritic material in the form of sulphates, is diluted with "return acid" which usually has a concentration of about 150 to 200 g./l. $H_2SO_4$, or with zinc sulphate.

The selection of either of these diluents will depend on the type of neutralizing agent selected for use in a manner hereinafter described.

The degree of dilution will depend on the iron sulphate content of the solution. High iron concentration requires a long time for precipitation.

By increasing the volume of the solution, i.e., by diluting, the precipitation time is decreased, and sedimentation properties are improved.

A neutralizing agent is then progressively added to the resulting diluted solution to an acid concentration of about 3 to 5 g./l. $H_2SO_4$. The neutralizing agent may be sintered blend or zinc calcine. When sintered blend is used, the diluent, previously mentioned, will be return sulfuric acid. The use of zinc calcine will require zinc sulphate as a diluent. Sintered blend is preferred because of its physical form and the marked zinc content solubility which is characteristic of such a blend. Of course the iron content of the sintered blend will also dissolve, during neutralization, in the form of iron sulphate. However, according to this process, this iron content as well as that produced from the first stage will begin to separate from solution in the form of basic sulphate, even when the acidity of the solution is 30–40 g./l. $H_2SO_4$.

The basic iron sulphate precipitate is granular, not very voluminous, and easily filtered and sedimented, especially if sedimentation is facilitated by adding some flocculating agent. Small quantities of iron that might be present in the separated filtrate may be oxidized with manganese dioxide and removed therefrom.

In the absence of indications to the contrary all proportions and concentrations of materials are expressed on a weight basis.

The following examples will further illustrate the invention.

Example 1

200 grams (dry weight) of zinc plant residues having a 16.4% zinc content, were leached for two hours at a temperature of 95° C. with one litre of prepared acid (300 g./l. of $H_2SO_4$) in a laboratory glass equipped with a stirring device. At the end of the time mentioned stirring was stopped and the residue was decanted off. This residue was washed and dried.

The results obtained were as follows. Weight of the dry residue of this lixiviation 49.40 grs. Analysis of this residue:

| | | |
|---|---|---|
| Total zinc | percent | 1.15 |
| Pb | do | 24.00 |
| Ag | g./t | 175.00 |
| Fe | percent | 3.00 |
| S (total) | do | 15.80 |
| S (sulphate) | do | 15.08 |

This represents a 98.29% recovery of the zinc contained in the original residue. The solution resulting from this stage having an acid concentration of about 200 g./l. $H_2SO_4$ was first diluted with half a litre of water which had been used in the washing of the previous residue and made up to a volume of 4 litres with "return acid."

An anlysis of this solution showed the following:

| | G./l. |
|---|---|
| $H_2SO_4$ | 154.00 |
| Fe | 14.50 |

This new solution was heated to 90° C. and 486 grs. of sintered blende with 68.15% of zinc was added thereto. Two hours after adding the sintered blende 5 grs. of $MnO_2$ were added to oxidize the $Fe^{++}$. After three hours stirring $H_2SO_4$ and Fe determinations were made.

The results found were as follows:

| | G./l. |
|---|---|
| $H_2SO_4$ | 18.00 |
| Fe | 8.40 |

It is interesting to note that the precipitation of the major part of the Fe, occurred even when the acidity was 18.00 g./l. Afterwards 30 grs. of ground sintered material was gradually added to the solution. After 8 hours stirring a further determination of $H_2SO_4$ and Fe was undertaken.

The findings were:

| | G./l. |
|---|---|
| $H_2SO_4$ | 4.00 |
| Fe | 1.30 |

The test was considered ended. Stirring was stopped and "Separán" (flocculating) solution was added to facilitate sedimentation. The latter occurred satisfactorily.

The results were as follows.

| | |
|---|---|
| Weight of the washed and dried residue (grams) | 288.70 |
| Analysis of this residue (percent): | |
| Total zinc | 1.60 |
| Fe | 29.60 |
| $SO_4$ | 36.84 |
| Full balance of the test (grams): | |
| Zinc in the original residue | 200×16.40% = 32.80 |
| Zinc in the sintered material | 486×68.15% = 331.20 |
| Zinc in the ground sintered | 30×69.50% = 20.80 |
| Total zinc in the raw material | 384.80 |
| Zinc in the first residue | 49.4×1.15% = 0.56 |
| Zinc in the second residue | 228.7×1.6% = 3.66 |
| Total | 4.22 |
| Total recovered zinc | 384.80−4.22 = 380.58 |
| Percentage of recovered zinc | 380.58 = 98.90 |
| Total | 384.880 |

Example 2

200 grs. of zinc plant residues having a 17% Zn content, was treated following exactly the method described in Example 1. The findings were:

| | | |
|---|---|---|
| Weight of the residue | g./l. | 50.2 |
| Zn in residue | percent | 1.21 |
| Recovered Zn | percent | 98.23 |

The resulting solution was diluted with half a litre of water used to wash the previous residue and made up the volume to 4 litres with neutral zinc sulphate solution.

| | |
|---|---|
| Acidity of the resulting solution | 44 g./l. $H_2SO_4$. |
| Fe in solution | 14.5 g.l. |

This new solution was heated to 95° C. before adding progressively 170 grs. flash calcine with 66.88% of Zn. After 8 hours stirring an analysis of the solution showed:

| | |
|---|---|
| Acidity | 5 g./l. $H_2SO_4$. |
| Fe | 1.5 g./l. Fe. |

The test was then considered finished. "Separán" solution to facilitate the sedimentation of the basic iron sulphate, which took place satisfactorily.

| | |
|---|---|
| Weight of the washed and dried residue (g./l.) | 168.5 |
| Percentage of zinc in this residue | 3.39 |
| Balance of zinc in this test (grams): | |
| Zinc in the original residue | 200×17% = 34.00 |
| Zinc in the flash calcine | 170×66.88% = 113.69 |
| Total zinc in the raw material | 147.69 |
| Zinc in the first residue | 50.2×21% = 0.60 |
| Zinc in the second residue | 168.50×3.39% = 5.71 |
| Total zinc in residues | 6.31 |
| Total recovered zinc | 147.69−6.31 = 141.38 |
| Percentage of recovered zinc | 141.38 = 95.7 |
| | 147.69 |

It may be easily inferred from the present disclosure, that a potential difficulty resulting from an accumulation of sulphate ions in the system is obviated by eliminating such ions from the system in the form of basic iron sulphate.

The principle, preferred embodiments and modes of operation of the present invention have been described in the foregoing specification. However, it should be understood that the invention which is intended to be protected herein may be practiced otherwise than as described without departing from the appended claims.

We claim:

1. A process for recovering zinc values from zinc plant residue containing zinc ferrite and heavier metals while maintaining atmospheric pressure and a temperature of about 90–95° C. which comprises:

(1) treating said residue with a sulfuric solution having an initial concentration of not less than 300 g./l. $H_2SO_4$ thereby dissolving said residue to obtain a resulting solution containing zinc sulphate and iron sulphate, said resulting solution having a sulfuric acid concentration of 180–200 g./l., (2) separating undissolved residue from said solution,
(3) adding return sulfuric acid from an electrolytic zinc recovery process to said solution in an amount so as to obtain a more dilute iron sulphate solution to decrease the precipitation time and improve the sedimentation properties of the iron sulphate,
(4) neutralizing said solution with sintered blend to an acidity of about 3–5 g./l. $H_2SO_4$ so as to form a granular basic iron sulphate precipitate and a zinc sulphate solution,
(5) separating said basic iron sulphate precipitate from said zinc sulphate solution.

2. A process as defined in claim 1 which further comprises oxidizing residual ferrous irons in said dilute solution with manganese dioxide.

3. A process for recovering zinc values from zinc plant residues containing zinc ferrite and heavier metals while maintaining atmospheric pressure and a temperature of about 90–95° C. which comprises:
(1) treating said residue with a sulphuric acid solution having an initial concentration of not less than 300 g./l. $H_2SO_4$ thereby dissolving said residue to obtain a resulting solution containing zinc sulphate and iron sulphate, said resulting solution having a sulfuric acid concentration of 180–200 g./l.,
(2) separating undissolved residue from said solution,
(3) adding zinc sulphate to said solution in an amount so as to obtain a more dilute iron sulphate solution to decrease the precipitation time and improve the sedimentation properties of the iron sulphate,
(4) neutralizing said solution with zinc calcine to an acidity of about 3–5 g./l. $H_2SO_4$ so as to form a granular basic iron sulphate precipitate and a zinc sulphate solution,
(5) separating said basic iron sulphate precipitate from said zinc sulphate solution.

4. A process as defined in claim 3 which further comprises oxidizing residual ferrous irons in said dilute solution with manganese dioxide.

References Cited

UNITED STATES PATENTS

| | | | |
|---|---|---|---|
| 1,906,074 | 4/1933 | Mertes | 23—125 |
| 1,937,632 | 12/1933 | Christensen | 23—125 |
| 2,754,174 | 7/1956 | Roberts | 23—125 |
| 3,193,382 | 7/1965 | Veltman | 75—115 |

OSCAR R. VERTIZ, *Primary Examiner.*

G. O. PETERS, *Assistant Examiner.*

U.S. Cl. X.R.

75—115, 120